May 20, 1958  E. J. DILLMAN  2,835,446
HEATING AND COOLING SYSTEM AND VALVE THEREFOR
Filed Nov. 22, 1955  2 Sheets-Sheet 2
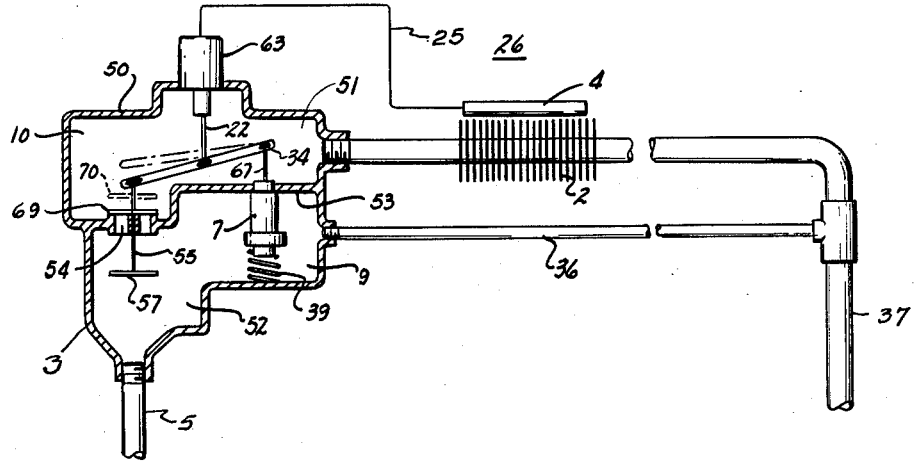
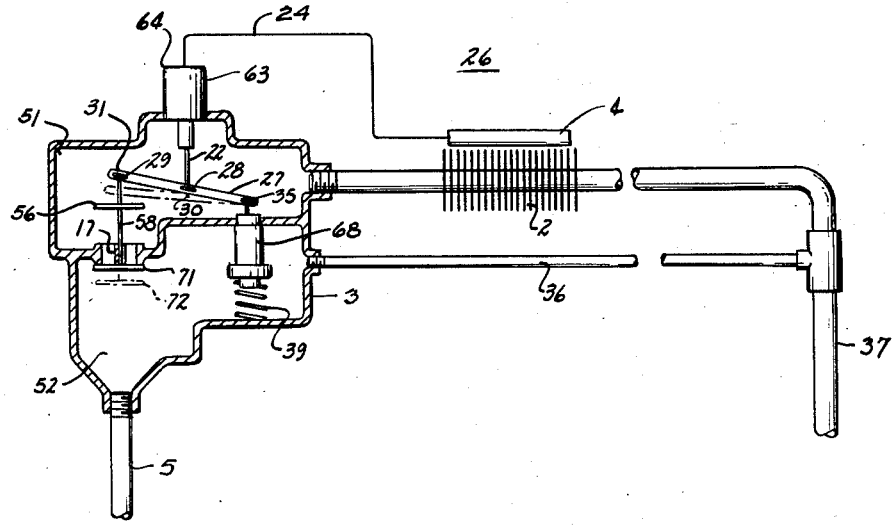
INVENTOR.
EARNEST J. DILLMAN
BY
SMITH, OLSEN & KOTTS
ATTORNEYS

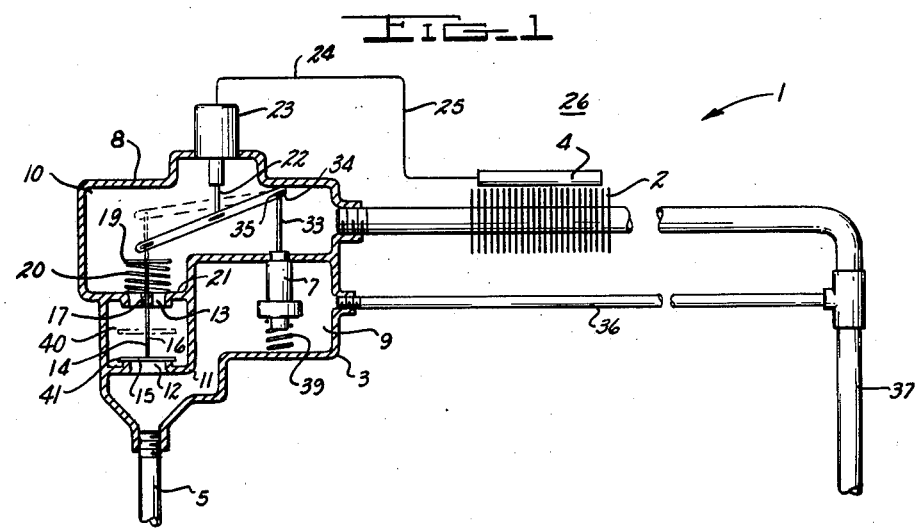

United States Patent Office 2,835,446
Patented May 20, 1958

2,835,446

HEATING AND COOLING SYSTEM AND VALVE THEREFOR

Earnest J. Dillman, Detroit, Mich., assignor, by mesne assignments, to American Radiator & Standard Sanitary Corporation, New York, N. Y., a corporation of Delaware Application November 22, 1955, Serial No. 548,457

3 Claims. (Cl. 236—1)

This invention relates to a heating and cooling system and to a valve for use therein.

Under one type of heating and cooling system a single heat exchange coil is provided for both heating and cooling. In the summer the heat exchange coil is connected with a source of cooling fluid and in the winter the heat exchange coil is connected with a source of heating fluid.

A valve is provided for controlling the supply of fluid to the coil, and a temperature responsive power mechanism is provided for controlling the operation of the valve. The temperature responsive mechanism includes a bulb containing thermally expansible material located adjacent the heat exchange coil. When the temperature of the atmosphere adjacent the heat exchange coil falls below a predetermined value the material in the bulb contracts, and when the temperature of the atmosphere adjacent the heat exchange coil rises above said predetermined value the material in the bulb expands. Expansion and contraction of the bulb material serves to operate the aforementioned valve.

During summer operation, expansion of the bulb material (as when the temperature rises above the desired predetermined value) must be utilized to open the valve so as to admit cooling fluid through the heat exchange coil. During winter operation expansion of the bulb material must be utilized to close the valve so as to prevent flow of heating fluid through the heat exchange coil. A problem exists therefore in how to economically translate expansive movement of the bulb material into valve-opening movement in the winter and valve-closing movement in the summer.

The present invention solves this problem by providing the valve with a second temperature responsive power mechanism. Flow of heating fluid around this second temperature responsive mechanism causes expansive movement of the first power mechanism to be translated into valve-closing movement. Flow of cooling fluid around this second temperature responsive mechanism causes expansive movement of the first power mechanism to be translated into valve-opening movement.

One object of the invention is to provide a heating and cooling system, and valve means therefor, wherein a single heat exchange coil can be utilized as a heating medium in winter and as a cooling medium in summer.

Another object is to provide a heating and cooling system, and valve means therefor; wherein the valve, when it is connected to a source of cooling fluid automatically opens with an increase in the external temperature, and when it is connected to a source of heating fluid automatically closes with an increase in the external temperature.

Another object is to provide a valve of the above-mentioned type which is of relatively simple construction and can be manufactured at low cost.

Other objects of this invention will appear in the following description and appended claims, reference being had to the accompanying drawings forming a part of this specification wherein like reference characters designate corresponding parts in the several views.

In the drawings:

Fig. 1 is a view, partly in section and partly schematic, showing one embodiment of the invention set for winter operation, Fig. 2 is a view taken in the same direction as Fig. 1, but showing the Fig. 1 embodiment set for summer operation.

Fig. 3 is a view, partly in section and partly schematic, showing a second embodiment of the invention set for winter operation, and Fig. 4 is a view taken in the same direction as Fig. 3 but showing the Fig. 3 embodiment set for summer operation.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In Figs. 1 and 2 there is shown a heating and cooling system 1 including a diagrammatically illustrated heat exchange coil 2 having a by-pass conduit 36, a valve 3 for controlling the admission of heat exchange fluid to coil 2, and a bulb 4 containing thermally expansible material.

During summer operation (Fig. 2) inlet pipe 5 for valve 3 is connected to a source of cooling fluid (by a manually actuated valve mechanism not shown). Bulb 4 is positioned in the areas to be cooled, and expansion of its thermally expansible material (as when the external temperature rises above a predetermined temperature) causes valve means 14 to open so as to admit cooling fluid to coil 2.

During winter operation (Fig. 1) inlet pipe 5 is connected to a source of heating fluid (by a manually actuated valve mechanism not shown). Valve 3 is provided with a thermally responsive element 7 which automatically sets a lever 27 in such position that expansive movement of the material in bulb 4 closes valve means 14 to flow of heating fluid through coil 2.

Valve 3 includes a valve housing 8 which serves to define first and second chambers 10 and 9. Wall means 11 and 21 define two aligned ports 12 and 13, and valve means 14 is mounted for slidable movement between these ports. Valve means 14 includes a valve element disc 15 and a valve rod 16 slidably mounted in a sleeve bearing 17. Walls 18 radiate from bearing 17 to surrounding wall means 21 so as to define the openings of port 13. A disc 19 is fixedly secured on rod 16, and a compression coil spring 20 is positioned between disc 19 and wall means 21. The function of spring 20 is to urge a piston 22 upwardly into housing 23 of a thermally responsive mechanism 24 (in response to contractive movement of the material in bulb 4). This action of spring 20 insures that piston 22 will always take the same position relative to housing 23 per any given expansive-contractive condition of the material in bulb 4.

Mechanism 24 includes the aforementioned bulb 4, a length of tubing 25, housing 23 and piston 22. Elements 4, 25, 23 and 22 may be of the same construction as elements 20, 19, 15 and 14 in United States Patent No. 2,534,251 issued to E. J. Dillman. The action of mechanism 24 is such that when the material in bulb 4 expands (as on temperature increase of ambient atmosphere 26 above a predetermined value) piston 22 is forced downwardly out of housing 23, and when the material in bulb 4 contracts (as on temperature decrease in atmosphere 26) piston 22 is forced by spring 20 upwardly into housing 23.

During winter operation (Fig. 1) downward movement of piston 22 is translated into movement of valve disc 15 from its dotted line position 40 to its full line position 41.

During summer operation (Fig. 2) downward movement of piston 22 is translated into movement of valve disc 15 from its full line position 42 to its dotted line position 40. A lever 27 is provided for translating movement of piston 22 into movement of disc 15. This lever is equipped with a slot 28 for pivotally and slidably receiving a cross pin 30 on shaft 22, and a slot 29 for pivotally and slidably receiving a cross pin 31 on rod 16.

In order to change over from summer operation to winter operation, and vice versa, there is provided the previously mentioned thermally responsive element 7, which may be similar to element 72 in the above-mentioned United States Patent No. 2,534,251. Element 7 is provided with a piston 33 which is equipped with a cross pin 34 slidably and pivotally engaged in a slot 35 in lever 27. If desired, slots 28, 29 and 35 could be replaced by links in order ot effect the pivotal connections of lever 27.

During summer operation (Fig. 2) part of the cooling fluid flows from pipe 5 through chamber 9 and out through the previously mentioned heat exchanger by-pass conduit 36 to a return pipe 37. Flow of cooling fluid through chamber 9 causes the thermally responsive material in element 7 to contract so as to allow piston 33 to assume its Fig. 2 position. Throughout this "summer operation" cooling fluid will continuously flow past element 7 so as to maintain piston 33 in its Fig. 2 position. Pin 34 establishes a fulcrum point for lever 27 so that when piston 22 moves down in response to temperature increase in atmosphere 26 lever 27 is pivoted downwardly about pin 34, and valve disc 15 is moved from position 42 to position 40. Cooling fluid is thus allowed to flow from pipe 5, through port 12, around disc 15, through port 13, chamber 10, heat exchange coil 2 and return pipe 37. Temperature decrease in atmosphere 26 (which takes place as a result of the flow of cooling fluid through coil 2) causes disc 15 to be moved from position 40 to position 42. In position 42, chamber 10 and heat exchange coil 2 are closed to the cooling fluid.

During change-over from summer operation to winter operation a valve mechanism (not shown) is actuated to cause heating fluid to flow through pipe 5 instead of cooling fluid. Flow of heating fluid into chamber 9 causes the thermally expansible material in element 7 to expand and force piston 33 to its Fig. 1 position. Fulcrum point 34 is thereby shifted in such manner that subsequent downward movement of piston 22 (by contraction of bulb 4 material) causes disc 15 to be moved from open position 40 to closed position 41. Fulcrum 34 is "shifted" in the sense that it is changed relative to housing 8, not in the sense that it is changed relative to any particular point on lever 27. During winter operation port 12 is in operative registry with disc 15, and during summer operation port 13 is in operative registry with disc 15.

When heating fluid is supplied to pipe 5 (as during winter operation) disc 15 is moved from closed position 41 toward open position 40 in response to temperature decrease in atmosphere 26, and from position 40 toward position 41 in response to temperature increase in atmosphere 26.

When cooling fluid is supplied to pipe 5 (as during summer operation) disc 15 is moved from position 40 toward closed position 42 in response to temperature decrease in atmosphere 26, and from position 42 toward position 40 in response to temperature increase in atmosphere 26.

There is provided in chamber 9 a compression coil spring 39. If, during winter operation the temperature of the fluid in chamber 9 should become excessively high, piston 33 would tend to be pushed forcibly against wall 37. Spring 39 however allows this push on piston 33 to be translated into downward movement of element 7 away from intermediate housing wall 38 so as to prevent breakage of piston 33 and/or other elements of the valve mechanism.

The embodiment shown in Figs. 3 and 4 is in many respects similar to that shown in Figs. 1 and 2, and corresponding reference numerals are employed wherever applicable.

The Fig. 3 embodiment includes a valve housing 50. An interior wall 53 serves to define first and second chambers 51 and 52, and a port 54. For opening and closing port 54 there is provided a valve means 55. Means 55 includes two valve element discs 56 and 57; a valve rod 58 interconnects discs 56 and 57, and slidably extends through sleeve bearing 17. The upper end of rod 58 is provided with a cross 31 which operates in a slot 29 in lever 27. Lever 27 is provided with a slot 28 which receives a cross pin 30 secured on the lower end of a piston 22. Piston 22 extends into housing 63 of a thermally responsive mechanism 64. Mechanism 64 is similar in construction and function to previously mentioned mechanism 24 except that spring 20 (not shown) in the Fig. 3 embodiment is disposed within housing 63 in the same manner as spring 16 in the aforementioned Patent No. 2,534,251.

Lever 27 is provided with a slot 35 which receives a cross pin 34 secured on the upper end of a piston 67. Piston 67 extends into a housing 68 of a thermally responsive power element 7.

During winter operation (Fig. 3) heating fluid flows around element 7 so as to locate fulcrum 34 for lever 27 in the Fig. 3 position. Temperature decrease in atmosphere 26 causes mechanism 64 to move disc 56 from its full line position 69 to its dotted line position 70. Temperature increase in atmosphere 26 causes mechanism 64 to move disc 56 from position 70 to position 69.

During summer operation (Fig. 4) cooling fluid flows around element 7 so as to locate fulcrum 34 for lever 27 in the Fig. 4 position. Temperature increase in atmosphere 26 causes mechanism 64 to move disc 57 from position 71 toward position 72. Temperature decrease in atmosphere 26 causes mechanism 64 to move disc 57 from position 72 toward position 71.

In both the Fig. 1 and Fig. 3 embodiments there have been provided a mechanism 7 which is responsive to the fluid temperature in chamber 9 or 52. It is contemplated that mechanism 7 could be replaced with a mechanism responsive to the fluid temperature in pipe 5 or other conduit leading into pipe 5. This responsive mechanism could include a bulb (similar to bulb 4) and a length of tubing similar to tubing 25. The bulb could be extended into pipe 5 so as to be responsive to the temperature of fluid therein. Insofar as functional requirements are concerned it is only necessary that mechanism 7 be responsive (directly or indirectly) to the temperature of fluid entering valve 3.

Having thus described my invention, I claim:

1. A valve comprising a valve housing; port means in said housing; valve means for opening and closing said port means; one of said means including two spaced wall elements; the other means including a wall member between said wall elements; lever means for reciprocally moving said valve means to open and close the port means; first power means responsive to an external temperature for operating said lever means; the spacing between the wall elements being greater than the valve means movement obtained from operation of the first power means; and second power means responsive to valve fluid temperature for varying the fulcrum point of the lever means so as to vary the operative valve means-port means registration.

2. A valve comprising a valve housing having inlet and outlet openings; first and second chambers in said housing; said second chamber being in open communication with said inlet opening, and said first chamber being in open communication with said outlet opening; port means between said chambers; valve means for opening and closing said port means; one of said means including two spaced wall elements; the other means including a wall member between said wall elements; lever means for reciprocally moving said valve means to open and close the port means; first power means responsive to external temperatures for operating said lever means; the spacing between the wall elements being greater than the valve means movement obtained from operation of the first power means; and second power means responsive to fluid temperatures in the second chamber for varying the fulcrum point of the lever means so as to vary the operative valve means-port means registration.

3. A valve comprising a valve housing; port means in said housing; valve means for opening and closing said port means; one of said means including two spaced wall elements; the other means including a wall member between said wall elements; a lever having one end connected to said valve means; first power means responsive to an external temperature and pivotally engaging an intermediate point on said lever for opening and closing the port means; the spacing between the wall elements being greater than the valve means movement obtained from operation of the first power means; and second power means responsive to valve fluid temperature for varying the fulcrum point of the lever so as to vary the operative valve means-port means registration; said second power means being connected with the other end of the lever.

References Cited in the file of this patent

UNITED STATES PATENTS

| | | |
|---|---|---|
| 2,495,226 | Crago | Jan. 24, 1950 |
| 2,556,479 | McGrath | June 12, 1951 |
| 2,558,937 | Dillman | July 3, 1951 |
| 2,636,685 | Clark | Apr. 28, 1953 |
| 2,664,246 | Ray | Dec. 29, 1953 |